United States Patent
Malrait et al.

(10) Patent No.: US 11,404,982 B2
(45) Date of Patent: Aug. 2, 2022

(54) METHOD FOR ESTIMATING MECHANICAL PARAMETERS OF AN ELECTRICAL MOTOR

(71) Applicant: Schneider Toshiba Inverter Europe SAS, Pacy sur Eure (FR)

(72) Inventors: François Malrait, Jouy sur Eure (FR); Thomas Devos, Carrières sous Poissy (FR)

(73) Assignee: Schneider Toshiba Inverter Europe SAS, Pacy sur Eure (FR)

(*) Notice: Subject to any disclaimer, the term of this patent is extended or adjusted under 35 U.S.C. 154(b) by 91 days.

(21) Appl. No.: 17/087,702

(22) Filed: Nov. 3, 2020

(65) Prior Publication Data

US 2021/0135612 A1    May 6, 2021

(30) Foreign Application Priority Data

Nov. 4, 2019 (EP) .................................. 19306422

(51) Int. Cl.
*H02P 21/09* (2016.01)
*H02P 21/18* (2016.01)
(Continued)

(52) U.S. Cl.
CPC .......... *H02P 21/09* (2016.02); *H02P 21/0089* (2013.01); *H02P 21/18* (2016.02);
(Continued)

(58) Field of Classification Search
CPC .......... H02P 21/09; H02P 21/18; H02P 21/20; H02P 21/22; H02P 21/0089; H02P 2207/01
See application file for complete search history.

(56) References Cited

U.S. PATENT DOCUMENTS

2003/0146723 A1* 8/2003 Pavlov .................... H02P 21/18
                                                                    318/432
2010/0079104 A1* 4/2010 Becker .................... H02P 21/30
                                                                    318/802
(Continued)

FOREIGN PATENT DOCUMENTS

EP    3226406 A1    10/2017

OTHER PUBLICATIONS

Maia, C. A. et al., "A Neural Vector Control for Induction Machine", ISIE '97, Proceedings of the IEEE Symposium on Guimaraes, Portugal, Jul. 7-10, 1997, pp. 1265-1269.
(Continued)

*Primary Examiner* — Zoheb S Imtiaz
(74) *Attorney, Agent, or Firm* — Locke Lord LLP (57) ABSTRACT

A method for controlling an electrical motor taking in account slip frequency. The method including determining amplitude, phase and frequency of the stator voltage from voltage measurements, determining estimates for current components from current measurement and stator voltage phase, determining estimate for torque from voltage amplitude, frequency, current amplitude and motor data, determining estimate for speed from torque, frequency and motor data, and determining over-estimation of speed from speed estimate, torque estimate and slip frequency. The over-estimation may be used to improve functional safety of the motor.

7 Claims, 6 Drawing Sheets

(51) Int. Cl.
*H02P 21/20* (2016.01)
*H02P 21/22* (2016.01)
*H02P 21/00* (2016.01)

(52) U.S. Cl.
CPC .............. *H02P 21/20* (2016.02); *H02P 21/22* (2016.02); *H02P 2207/01* (2013.01)

(56) References Cited

U.S. PATENT DOCUMENTS

2014/0210391 A1* 7/2014 Bozic .................... H02P 21/26
318/400.11
2019/0036471 A1 1/2019 Hashimoto et al.

OTHER PUBLICATIONS

Chang, T-Y et al., "A Practical Vector Control Algorithm for Mu-Based Induction Motor Drives Using a New Space Vector Current Controller", IEEE Transactions on Industrial Electronics, vol. 41, No. 1, Feb. 1994, pp. 97-103.
Ohtani, T. et al., "Vector Control of Induction Motor without Shaft Encoder", IEEE Transactions on Industry Applications, vol. 28, No. 1, Jan./Feb. 1992, pp. 157-164.
Extended European Search Report dated Apr. 17, 2020 for European Application No. 19306422.7-1202, 11 pages.

\* cited by examiner

METHOD FOR ESTIMATING MECHANICAL PARAMETERS OF AN ELECTRICAL MOTOR

The present invention relates to a method for controlling a speed drive of a motor, and a drive for controlling a motor.

BACKGROUND

Speed drives are used for controlling and monitoring induction motors, also known as asynchronous motors. These drives control the voltages and currents applied to the stator of the motor. The currents in the windings of the stator create fluxes that induce currents in the windings of the rotor required to turn the motor and provide mechanical rotative power. This mechanical power may be expressed in terms of angular speed and load torque. Vice versa, induction motors may also be used as induction generators, meaning that mechanically driving the rotor will turn the stator and provide AC electrical power.

Due to the configuration of induction motors, a certain slip, i.e. a difference in speed between stator and rotor, is always present; else the motor would not operate. This slip is present in both motoring mode as in (re)generating mode, but may be different depending on the mode of operation.

In order to comply with safety regulations during operation, accurate information regarding the mechanical and electrical parameters is required. As safety limits, thresholds and precautions are based on such information. For example, motor speed may be used for predicting and following a certain trajectory, such as an object moving along a conveyor belt or a crane along rails, depending on the customer application. In particular for the purpose of functional safety control, the control operation should guarantee that actual motor speed does not exceed a safety reference. For example, to ensure that the object or crane has not travelled beyond a certain point. The safety reference may be constant or variable, depending on the use case: safe maximum speed SMS, safe limited speed SLS or safe stop SS1. Previously, such mechanical parameters were measured directly by e.g. speed sensors.

However, sensorless induction motor control solutions have been developed to reduce costs by eliminating the need for speed sensors on the motor shaft. Such sensorless motor control solutions use e.g. induction motor state equations to calculate flux and speed from stator voltage and current values, in order to provide an estimate of speed of the motor. In order to enable functional safety control, the estimate motor speed should allow regulation and/or limitation of the speed to comply with the safety reference.

Accordingly, there is a need for accurately estimating mechanical operating parameters, such as the speed and torque, from measured electrical operating parameters.

SUMMARY OF INVENTION

It is an object of the invention to improve estimation of mechanical parameters of electrical motors in all operating conditions, while taking in account slip. This allows to enhance functional safety by providing more accuracy for the over-estimation of speed.

According to the invention, this object is achieved by providing a method including determining amplitude, phase and frequency of the stator voltage from voltage measurements, determining estimates for current components from current measurement and stator voltage phase, determining estimate for torque from voltage amplitude, frequency, current amplitude and motor data, determining estimate for speed from torque, frequency and motor data, and determining over-estimation of speed from speed estimate, torque estimate and slip frequency.

According to one aspect, there is provided a method for controlling an electrical motor based on the over-estimation of rotor speed.

According to another aspect, there is provided a speed drive for controlling an electrical motor taking in account an over-estimation of rotor speed. The electrical motor being an induction or asynchronous motor.

According to yet another aspect, there is provided an electrical motor system including a speed drive for controlling the electrical motor taking in account an over-estimation of rotor speed.

Particularly advantageous elaborations of the invention are laid down in the dependent claims.

BRIEF DESCRIPTION OF DRAWINGS

By way of example only, the embodiments of the present disclosure will be described with reference to the accompanying drawing, wherein.

DETAILED DESCRIPTION

Figure 1:
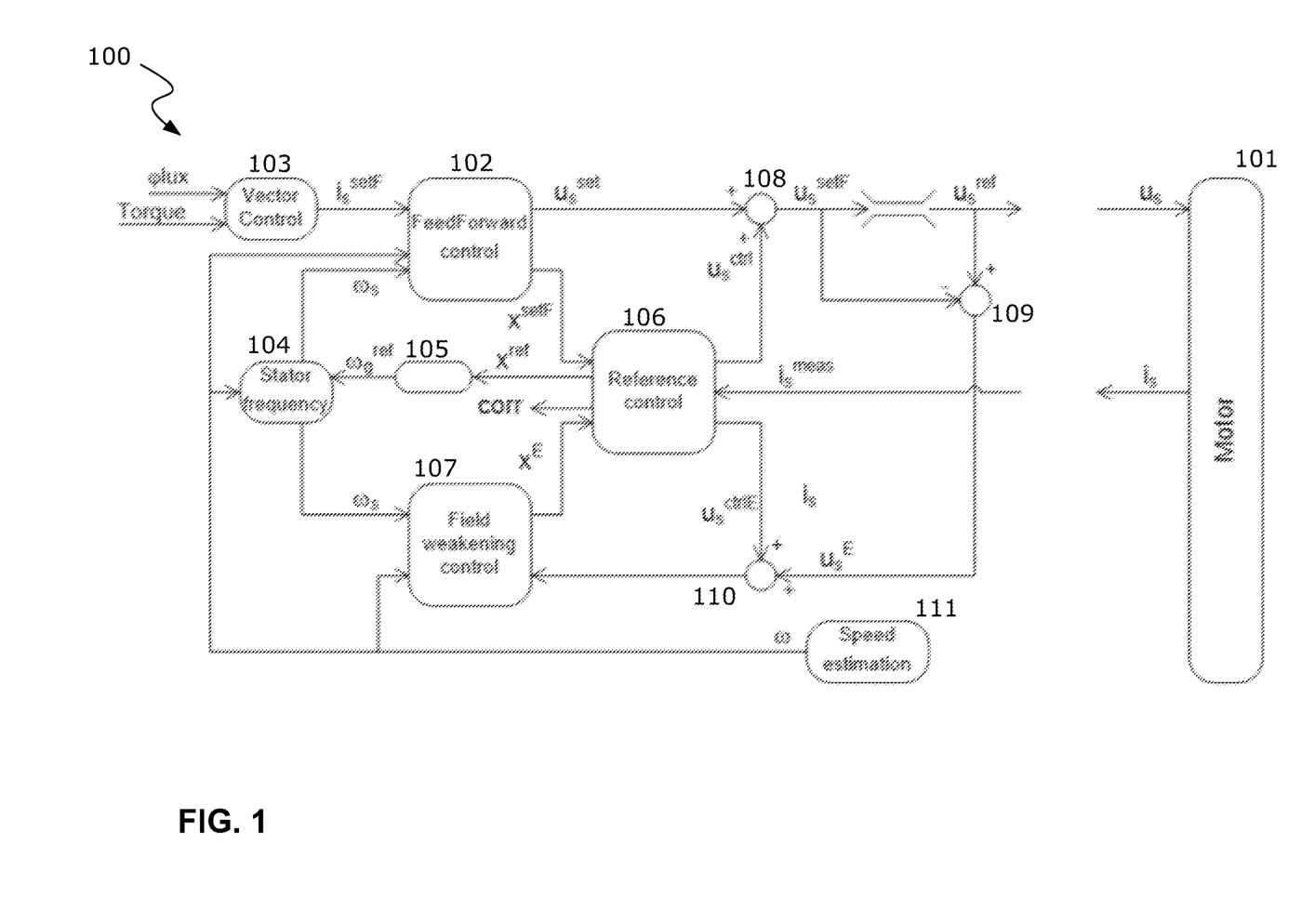
FIG. 1 is a block diagram of an example of motor control scheme.

Referring to FIG. 1, a basic block diagram 100 for motor control is shown. A drive for controlling a motor 101 regulates a voltage Us as input of the motor for controlling the motor speed. A current Is is fed back as output from the motor and measured for reference.

The control scheme includes feed forward control block 102 which outputs a voltage setpoint Us-set based on inputs for current Is-setF, motor speed estimate ω, and stator frequency ω-s. The current Is-setF is determined by vector control block 103 from inputs torque T and flux φ. The stator frequency ω-s. is determined by stator frequency determination block 104 from the motor speed estimate ω and speed slip reference ω-g-ref. The speed slip reference ω-g-ref in turn is derived by reference block 105 from reference vector value Xref, which in turn is determined by reference control block 106. Thereto reference control block 106 has as input measured current Is-meas, a setpoint reference vector value Xset-F provided by feed forward control block 102, and a correction vector value X-E provided by field weakening control block 107 to take into account voltage limitation, as will be explained below. In addition to reference vector value Xref, the reference control block 106 further provides as output a voltage control signal Us-ctrl, a voltage control error signal Us-ctrlE and a correction signal CORR.

The voltage control signal Us-ctrl is summed 108 with voltage setpoint Us-set to provide a voltage setpoint corrected for field signal Us-setF. This signal is used to deliver the reference voltage Us-ref for the motor as motor input voltage Us.

The voltage setpoint corrected for field signal Us-setF is further subtracted 109 from the reference voltage Us-ref to provide a voltage error signal Us-E.

The field weakening control block 107 provides the above mentioned output vector value X-E based on speed estimate ω, stator frequency ω-s, and a summed value 110 of voltage error signal Us-E and voltage control error signal Us-ctrlE.

Field weakening is the action of reducing field flux when the motor is already operating at maximum voltage at which the speed of the motor may only be further increased by reducing the flux. Which in turn requires an increase in current in order to maintain torque.

The above described motor control scheme 100 may take advantage of an improved estimation of motor speed ω. The method disclosed herein may for example be carried out by speed estimation block 111.

Figure 2:
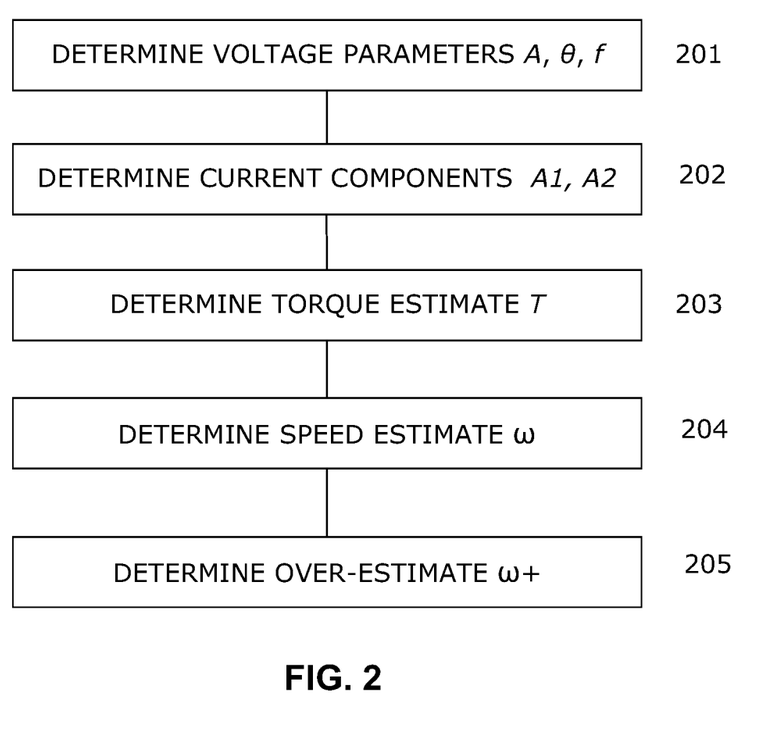
FIG. 2 illustrates an example of a method for motor speed estimation in accordance with the invention.

Referring to FIG. 2, an example of a method for motor speed estimation is shown. The method includes determining 201 voltage amplitude A, stator phase θ and stator frequency ω-s from voltage measurements. And determining 202 estimates for current amplitudes A1, A2 of two current components from current measurement and stator phase θ. From the determined values for voltage amplitude A, stator frequency ω-s, current components A1, A2 and from motor data MD in addition, an estimate for torque T may be determined 203. The motor data MD may be generally available from a digital data sheet or other digital specification document.

Then an estimate for speed ω may be determined 204 from the estimated torque T, stator frequency ω-s and motor data MD, estimating intermediate value slip frequency f-slip ω-g. After which a final over-estimation of speed ω+ may be determined 205 from the speed estimate ω and torque estimate T.

Figure 3:
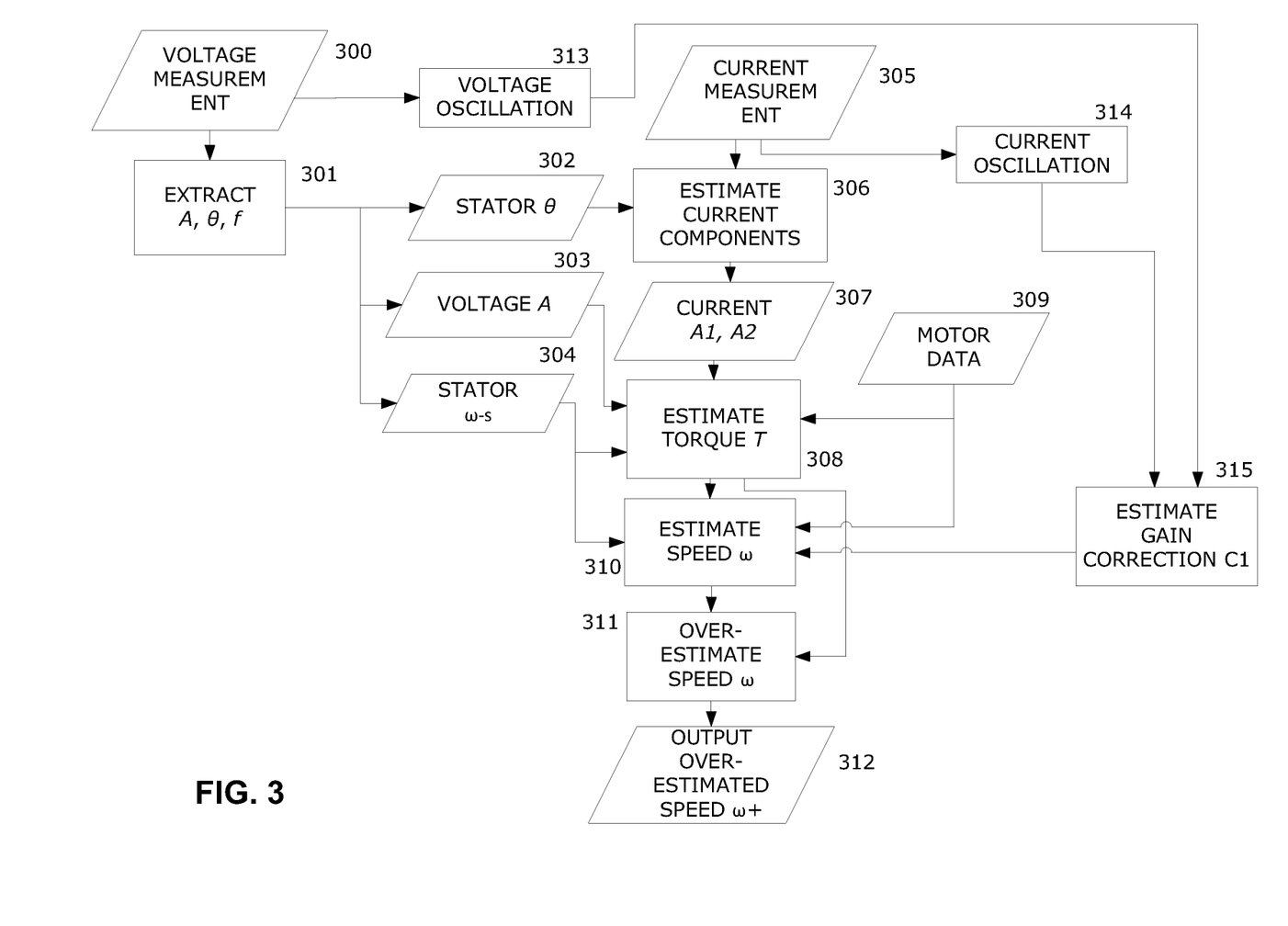
FIG. 3 illustrates an example of a flowchart in accordance with the invention.

Referring to FIG. 3, an example of flow diagram implementing the method of FIG. 2 is shown. Voltage measurements 300 are provided to extraction process 301 for extracting the following parameters: voltage magnitude i.e. amplitude A 303, stator voltage phase θ 302 and stator frequency ω-s 304. Current measurements 305 are provided together with stator phase θ 302 to estimation process 306 for estimating current components A1, A2 307. The voltage amplitude A 303, stator frequency ω-s 304, the currents components A1, A2 together with motor data MD 309 are provided to estimation process 308 for estimating torque T.

The voltage measurement 300 is also processed to detect a voltage ripple value R1 and determine 313 if the voltage ripple value R1 validates use of voltage oscillation information. The current measurement is also processed to detect a current ripple value R2 and determine 314 current oscillation. The voltage and current oscillations are used to estimate 315 a gain correction factor C1, which aims to take into account temperature dependency of rotor resistance as will be explained below.

The correction factor C1, stator frequency ω-s 304, estimated torque T 308, and motor data MD 309 are provided to estimation process 310 for estimating motor speed ω. And finally estimated motor speed ω 310 and estimated torque T 308 are provided to over-estimation process 311 for over-estimation of motor speed ω+, which over-estimated speed ω+ is provided as final output 312.

Extraction process 301 for amplitude, phase and frequency concerns the extraction of parameters from measurements performed on three phase Voltage supply lines connected to the motor. Depending on which measurements are available, the extraction may be performed in various alternative ways.

Extraction of Voltage Magnitude $V_{Mag}$

As a first alternative, when voltage measurements are available from all three sinusoidal voltages, extraction of a Voltage magnitude $V_{Mag}$ may be based on evaluating an instantaneous mean. In order to extract an instantaneous mean, the three available voltages may be included according to the following formula:

$$V_{Mag}(t) = \sqrt{\frac{2}{3} \cdot (U_1(t)^2 + U_2(t)^2 + U_3(t)^2)} \quad \text{eq. 1}$$

The accuracy of the estimation may depend on the quality of sinusoidal voltage waveform. Direct and indirect components may not yet be distinguished.

As another alternative, when only two voltages are available, extraction may be based on evaluating an instantaneous value, and the available voltages may be included according to the following formula:

$$V_{Mag}(t) = \sqrt{\frac{4}{3} \cdot (U_1(t)^2 + U_2(t)^2 + U_1(t)U_2(t))} \quad \text{eq. 2}$$

The accuracy of the estimation may again depend on the quality of sinusoidal voltage waveform, and whether it is equilibrated. Direct and indirect components may not yet be distinguished. When the mains supply voltage is equilibrated, which means that $U1=V \sin(\theta s(t)), U2=V \sin(\theta s(t)-2\ pi/3), U3=V \sin(\theta s(t)-4\ pi/3)$, then equation 2 leads to:

$$V_{Mag}(t) = \quad \text{eq. 3}$$
$$V \cdot \sqrt{(\sin(\theta s(t))^2 + \sin(\theta s(t) - 2\pi/3)^2 + \sin(\theta s(t))\sin(\theta s(t) - 2\pi/3))}$$

In case of one or more indirect components, the magnitude $V_{Mag}(t)$ shows a time dependency and is no more constantly equal to the magnitude of the direct voltage. In such case, the magnitude is oscillating around the direct voltage. The stator phase θs corresponds to the integration of the stator pulsation ω-s. In case of constant stator pulsation ω-s, the stator phase θs is equal to stator frequency ω-s.

As yet another alternative, when only one voltage is available, extraction may be based on evaluating a time period, and the available voltage may be included according to the following formula:

$$V_{Mag}(t) = \sqrt{\frac{2}{T} \cdot \int_{t-T}^{t} U_1(t)^2 \cdot dt} \quad \text{eq. 4}$$

Other alternatives may be based on minimum and maximum values extraction using a sliding window. For example, to obtain the magnitude of an oscillating signal, the maximum and minimum may be extracted, and then half of the difference gives the magnitude. Thus, for a pure sinusoidal waveform of magnitude S, with the maximum equal to S, the minimum equal to −S, and half of difference is equal to (S−(−S))/2=S. This extraction should be performed on a sliding window of length equal or higher to the period of oscillation. Doing so allows to dynamically follow variations of magnitude in a time scale of the signal frequency.

Other optional calculations may further be considered possible for extracting Voltage magnitude from any of the voltage signals.

Extraction of Stator Voltage Phase $\theta_S$

With the voltage magnitude derived as explained above, the stator voltage phase may be extracted from the ratios $U_1(t)/V_{Mag}$, $U_2(t)/V_{Mag}$, and $U_3(t)/V_{Mag}$.

Using an arccosine function and starting with $U_1(t)/V_{Mag}$, the following equations are to be solved:

$$\theta_S(t) = \pm a\cos\left(\frac{U_1(t)}{V_{Mag}(t)}\right) \qquad \text{eq. 5}$$

$$\theta_S(t) - \frac{2\pi}{3} = \pm a\cos\left(\frac{U_2(t)}{V_{Mag}(t)}\right) \qquad \text{eq. 6}$$

The difference should be equal to $$\frac{2\pi}{3},$$

which allows to solve the sign determination.

Extraction of Stator Voltage Frequency $\omega_S$

Based on a time approach the period may be derived by checking the duration between two voltage zero-crossings. The resulting frequency will then be equal to $(2\times\pi)/\text{Time}$. It would also be possible to realize a time-derivative from stator voltage phase ω-s:

$$\omega_S = (\theta_{St+Ts} - \theta_{St})/Ts \qquad (\text{eq.7}).$$

Combined Observer Approach for Extraction of Frequency and Phase $\omega_S$, $\theta_S$ In control theory, an observer approach refers to a state observer system that may provide an estimate of the internal state of a given real system from measurements of the input and output of the real system. From the observed internal state, further parameter values may be derived.

Figure 4:
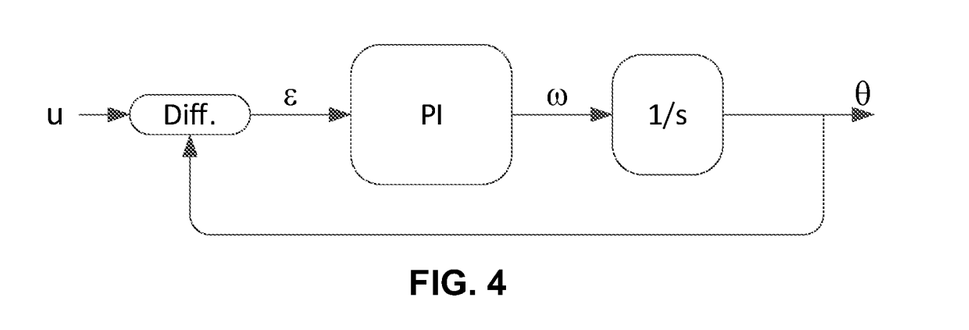
FIG. 4 illustrates an example of a basic observer system for motor control.

A basic observer system for the motor control is shown in FIG. 4. Input U may be a rotating normalized vector of 2 or 3 components. The Diff. module provides a difference between phase of input U and a feedback signal from output θ. The resulting signal E is fed to a proportional integrator PI, which provides the frequency ω of the input voltage U. A '1 over s', 1/s, integral block then delivers the output θ.

A particular combination with the output θ is realized to deliver the quantity E that is representative of the voltage phase φ. For instance:

$$\varepsilon = \frac{2}{3}\frac{\sin(\theta)\cdot U_1 + \sin\left(\theta - \frac{2\pi}{3}\right)\cdot U_2 + \sin\left(\theta - \frac{4\pi}{3}\right)\cdot U_3}{U_{Mag}}, \qquad \text{eq. 8}$$

wherein:

if $U_{i+1} = U\text{mag }\cos(\varphi - 2\pi/3i)$ for $i=0,1,2,$ eq.9 then $\varepsilon = \sin(\theta - \varphi)$ eq.10

From which equations the frequency $\omega_S$ and phase $\theta_S$ may be determined.

Figure 5:
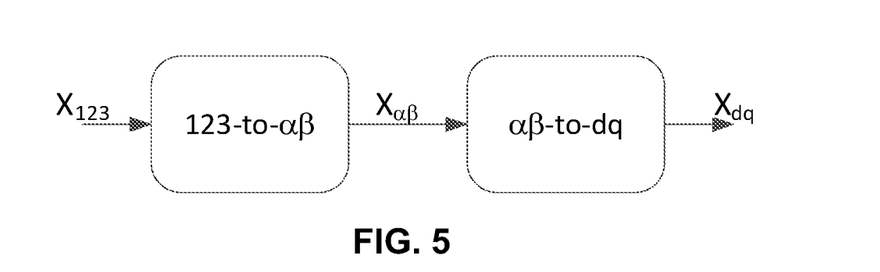
FIG. 5 illustrates an example of a classical transformation from tri-phase to 2-dimensional.

Transformation Approach for Extraction of Frequency and Phase $\omega_S$, $\theta_S$ As an alternative combined approach also a classical transformation from tri-phase systems 1-2-3 to 2-dimensional vectors αβ, as shown in FIG. 5, may be applied, due to the fact that the sum of components of tri-phase systems is zero. This in turn allows a rotation transformation from the rotational values αβ in a fixed frame to fixed values dq in a rotational frame.

Herein αβ-to-dq corresponds to a rotation of angle $\theta_S$. In the dq frame, Ud=$U_{Mag}$ and Uq=0. The transformation from 123-to-αβ frame may be represented in a classical manner by:

$$M = \begin{bmatrix} 2/3 & -1/3 & -1/3 \\ 0 & \sqrt{3}/3 & -\sqrt{3}/3 \end{bmatrix} \qquad \text{eq. 11}$$

Extraction process 306 for current components concerns the extraction of parameters from current measurements performed on three phase supply lines connected to the motor. Similar to the transformation applied to obtain the matrix of eq. 10, two transformations are applied to the current.

So, first Iα and Iβ are to be calculated:

$$I_\alpha = \frac{(2I_1 - I_2 - I_3)}{3} \qquad \text{eq. 12}$$

$$I_\beta = \frac{\sqrt{3}}{3}(I_2 - I_3) \qquad \text{eq. 13}$$

Defining the complex number Iα+j Iβ, we get Iαβ. From which transformation αβ-to-dq should result to define Idq=Iαβ exp(−j $\theta_S$), which gives two current components Id and Iq.

The two current components Id and Iq serve as input for the torque estimation process 308. The torque may be estimated from active power:

$$T_q = \frac{P_{active} - \frac{3}{2}R_S \cdot (I_d^2 + I_q^2)}{\omega_s / Np}, \qquad \text{eq. 14}$$

$$\text{wherein } P_{active} = \frac{3}{2} \cdot (U_a \cdot I_a + U_q \cdot I_q) \qquad \text{eq. 15}$$

Estimation process 310 for speed ω may be implemented as follows:

Based on the knowledge that the slip frequency is at first order linear with torque, it can be deduced:

$$\omega_G = k \cdot C_1 \cdot R_R \cdot T_q \qquad \text{eq.16}$$

wherein the constant k is typically calculated from nominal value, and wherein C1 is the gain correction factor applied to a default rotor resistance value Rr to obtain an actual rotor resistance value. As once current flows in the motor, dissipation effects may occur inducing a rise in temperature which may influence rotor resistance. In case the rotor resistance does not change with temperature C1 may be set equal to 1.

Then, the motor speed ω may be calculated as follows:

$$\omega = \omega_S - \omega_G = \omega_S - k \cdot C_1 \cdot R_R \cdot T_q = \quad \text{eq. 17}$$

$$\omega_S - \frac{\omega_{SN} - \omega_N}{T_{qN}} \frac{P_{active} - \frac{3}{2}R_S \cdot (I_d^2 + I_q^2)}{\frac{\omega_S}{Np}} =$$

$$\omega_S - (\omega_{SN} - \omega_N) \cdot \frac{\omega_N}{\omega_S} \cdot \frac{P_{active} - \frac{3}{2}R_S \cdot (I_d^2 + I_q^2)}{P_{WN}}$$

The over-estimation process 311 for over-estimated speed ω+ may be implemented as follows. In motoring mode, stator frequency, or pulsation, is an overestimation of the rotor speed, as the slip frequency will have the same sign as the rotor speed. Which would alleviate the sign determination. However, as drives may be in either motoring or generating mode, it is required to enable sign determination in either mode.

Figure 6:
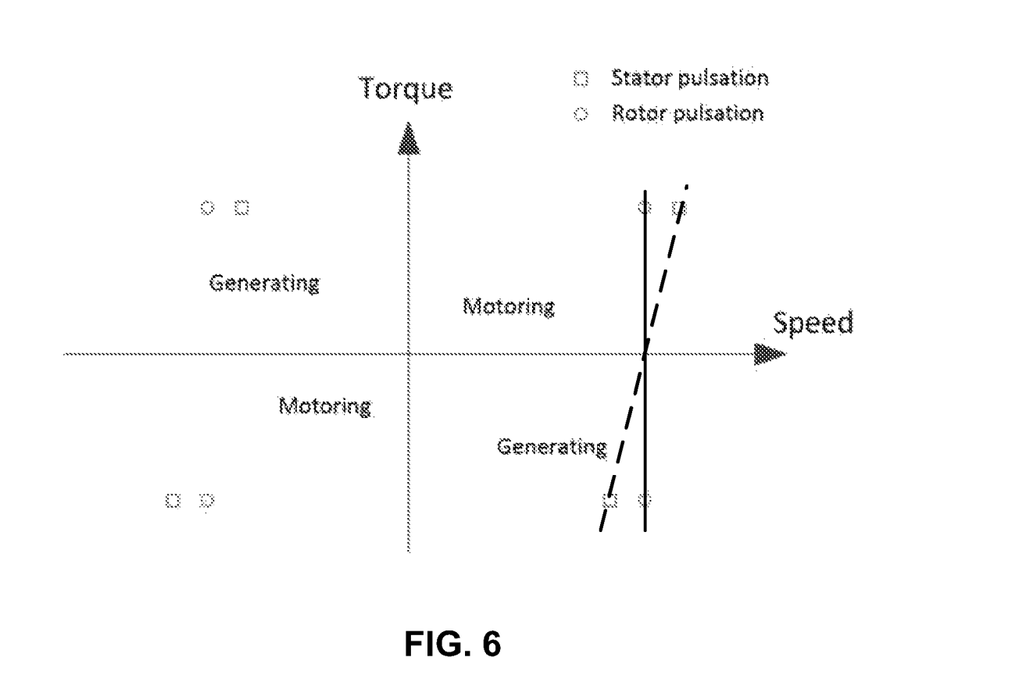
FIGS. 6 and 7 illustrate schematically operating modes in dependence of torque and speed.
Figure 7:
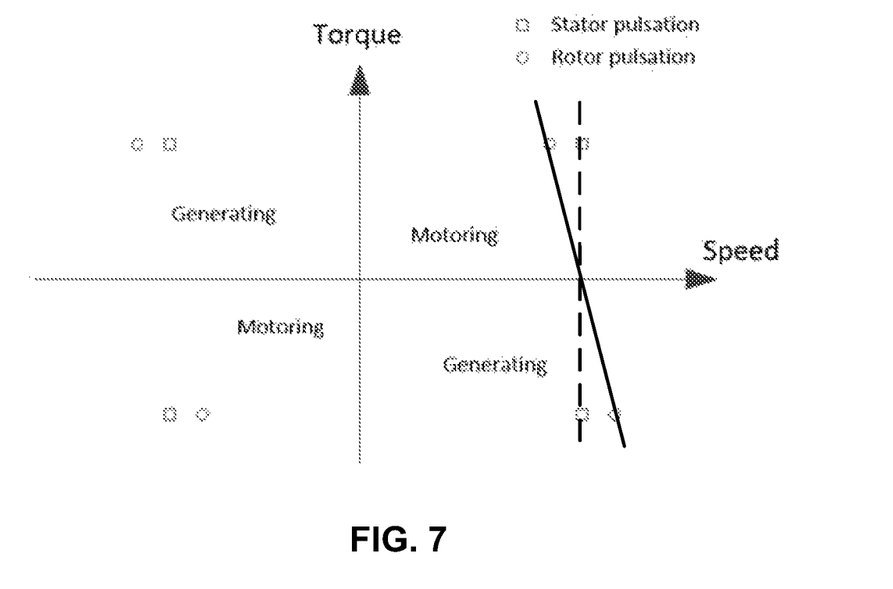

Shown in FIGS. 6 and 7, is the relation between the signs, negative or positive, of speed and torque and the corresponding operating mode, generating or motoring, per quadrant. As mentioned above, the stator frequency is equal to the sum of rotor frequency and slip frequency. The slip frequency is positive in motoring mode, and negative in generating mode.

For instance, in the example of FIG. 6, in the top right quadrant, the drive is are in motoring mode. The slip frequency will increase when torque is increasing. FIG. 6 shows the example of keeping rotor frequency constant. In this case, when torque is increasing, stator frequency will increase; in accordance with the sum of constant rotor frequency and increasing slip frequency.

For another instance, in the example of FIG. 7, in the top right quadrant, the drive is in motoring mode. The slip frequency will increase when torque is increasing. FIG. 7 shows the example of keeping stator frequency constant. In this case, when torque is increasing, rotor frequency decreases; in accordance with the difference of constant stator frequency and increasing slip frequency.

The same principle applies similarly in generating mode, with the exception that then the signs of speed and torque may change which of the signals is larger in absolute value.

In all the cases, the stator frequency $\omega_S$ is equal to the sum of rotor frequency $\omega_R$ and slip frequency $W_G$:

$$\omega_S = \omega_R + \omega_G \quad \text{eq.18}$$

In the case when slip frequency $\omega_G$ is positive, i.e. positive torque:
When $\omega_R > 0$ it follows from eq.18 that $|\omega_S| > |\omega_R|$
When $\omega_R < 0$ it follows from eq.18 that $|\omega_S| < |\omega_R|$
In the case when rotor frequency $\omega_R$ is positive, i.e. positive speed:
When Torque>0, then $\omega_G > 0$, and it follows from eq.18 that $|\omega_S| > |\omega_R|$
When Torque<0, then $\omega_G < 0$, and it follows from eq.18 that $|\omega_S| < |\omega_R|$
Based on the above, an over-estimation of speed may be provided in each case as represented in FIGS. 6 and 7 by selecting a speed margin, and defining for instance:

$$\omega^{OverEstimation} = \omega_R + \omega_{MARGIN} \cdot \text{sign}(\omega_R) \quad \text{eq.1}$$

Depending on the sign of speed as calculated eq.18, a sufficient margin may be added or subtracted in order to optimize performance with regard to safety control. The margin value may be constant, or depend on slip frequency, or depend on power.

Classically, when power is positive, meaning the motor is working in motoring mode, the margin is selected equal to absolute value of slip frequency. In this case, the over estimated speed is given by stator pulsation.

$$\omega_{MARGIN\ MOTORING} = |\omega_G| \quad \text{eq.20}$$

That leads to $$\omega^{OverEstimation\ MOTORING} = \omega_R + \omega_{MARGIN\ MOTORING} \cdot \text{sign}(\omega_R) = \omega_S$$

Typically, when power is negative, meaning the motor is working in generating mode, the margin can be selected equal to absolute valuer of slip frequency subtracted to a predefined maximum slip frequency $$\omega_{MARGIN\ GENERATING} = \omega_{GMAX} - |\omega_G| \quad \text{eq.20}$$

That leads to $$\omega^{OverEstimationGENERATING} =$$
$$\omega_R + \omega_{Margin\ GENERATING} \cdot \text{sign}(\omega_R) = \omega_S + \omega_{GMAX} \cdot \text{sign}(\omega_R)$$

Figure 8:
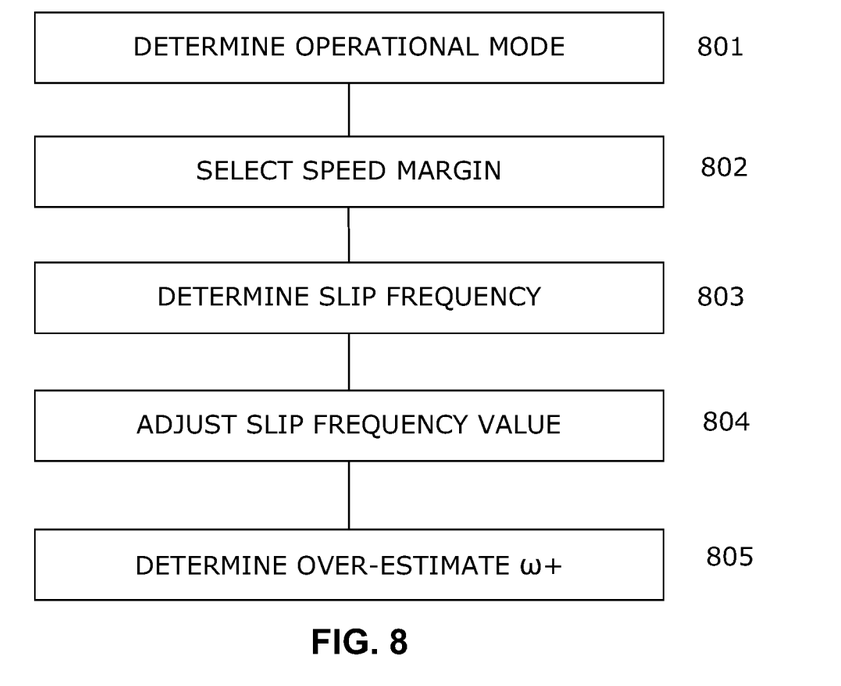
FIG. 8 illustrates an example of a method for adjusting a determined slip frequency value.

Referring to FIG. 8, the method as described in relation to FIG. 2 is provided in more detail. In order to determine over-estimation of speed ω+ 205, the method may further include determining 801 an operational mode, the operating mode being either motoring or generating. As explained in relation to FIGS. 6 and 7, the signs of both torque and speed depend on the operating mode, and therewith need to be take in account for determining a safety margin.

Accordingly, the method may further include selecting a speed margin 802 depending on the operational mode. A list of pre-determined safety margins may be provided as a set of fixed values for particular circumstances. Or specific calculations may be performed in order to provide an optimum safety margin.

Based on the determined 801 operating mode a sign of slip frequency ω-s depending on the operational mode may be determined 803. The value of slip frequency ω-s used for further estimation may then be adjusted 804 by the speed margin and the sign of the slip frequency ω-s. Consequently, the method may include determining over-estimation 805 of speed based on the adjusted slip frequency.

As explained in relation to the flowchart shown in FIG. 3, determining amplitude as part of determining voltage parameters 201 may be based on either voltage measurements available for each of three phase voltages, or voltage measurements available for two out of three phase voltages, or a single voltage measurement available out of three phase voltages using a time period.

As likewise explained in relation to the flowchart of FIG. 3, determining 203 the estimate for torque may include computing active power from voltage and current, as discussed for module 308. And similarly, as explained in relation to the flowchart of FIG. 3, determining 202 estimates for current components may include computing a transformation matrix for obtaining currents components, as discussed for module 306.

The method for providing an estimation of speed as disclosed may be advantageously used for controlling an electrical motor. Hence, a control unit for controlling an electrical motor through a speed drive may implement the method. The speed drive may either be a soft-starter or direct-on-line drive. Accordingly, such a control unit may be arranged for determining the over-estimation of speed according to the method disclosed. Applying the speed over-estimation to set a safety margin during operation of the electrical motor and controlling the motor in accordance with the set safety margin.

Furthermore, the method as disclosed may be implemented in a speed drive, whether soft-starter or direct-on-line drive, by including a control unit arranged for executing the method. Accordingly, an electrical motor system may be obtained, that includes an electrical motor and a speed drive as discussed above. Wherein the speed drive is connected to the electrical motor for controlling operation thereof.

Figure 9:
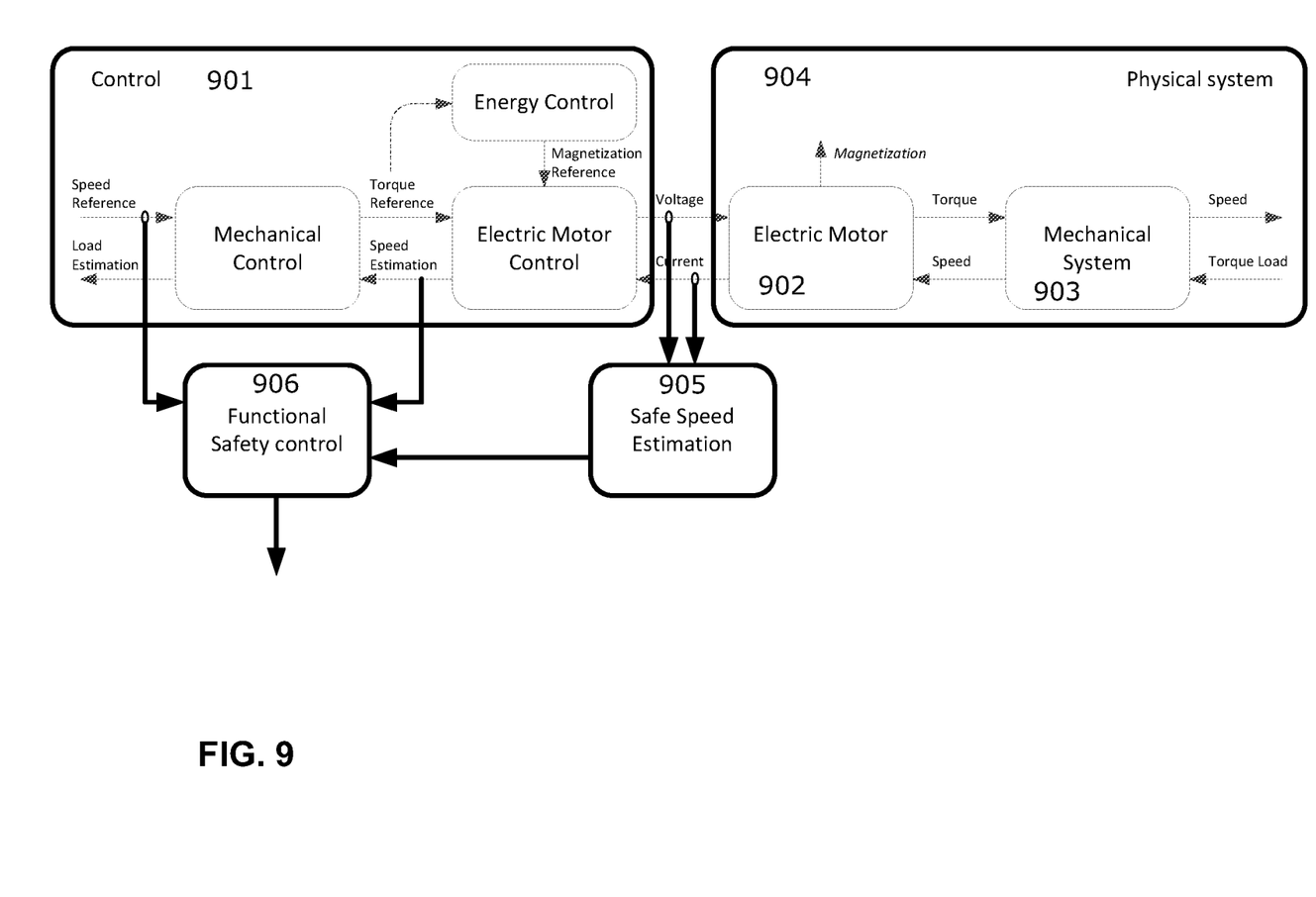
FIG. 9 illustrates schematically an example of an electrical motor system in accordance with the invention.

An example of such an electrical motor system is shown in FIG. 9, wherein a control unit 901 is arranged for controlling the electric motor 902. The electric motor 902 will drive a mechanical system including e.g. a gear and a hoist or a conveyor belt or components making up a mechanical system 903. The electric motor together with the mechanical system 903 may be viewed as physical system 904, with which the control system 901 interacts via voltage and current supply lines. Measurements on these voltage and current supply lines are fed to speed estimation system 905, which in turn interacts with safety control system 906.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for estimating mechanical parameters of an electrical motor, comprising: determining amplitude, phase and frequency of a stator voltage from voltage measurements; determining estimates for current components from current measurement and stator voltage phase; determining estimate for torque from voltage amplitude, frequency, current amplitude and motor data; determining estimate for speed from torque, frequency/pulsation and motor data; and determining over-estimation of speed from speed estimate, torque estimate and slip frequency, wherein determining over-estimation of speed further comprises: determining an operational mode being motoring or generating; selecting a speed margin depending on the operational mode; determining sign of slip frequency depending on the operational mode; adjusting the slip frequency by speed margin and sign; and determining over-estimation of speed based on the adjusted slip frequency.

2. The method according to claim 1, wherein the amplitude is determined either from: voltage measurements available for each of three phase voltages; voltage measurements available for two out of three phase voltages; a single voltage measurement available out of three phase voltages, using a time period.

3. The method according to claim 1, wherein determining estimate for torque further includes computing active power from voltage and current.

4. The method according to claim 1, wherein determining estimates for current components further includes computing a transformation matrix for obtaining currents components.

5. A method for controlling an electrical motor through a speed drive that comprises a soft-starter or direct-on-line drive, the method comprising:
   determining an over-estimation of speed according to claim 1; and
   applying the speed over-estimation to set a safety margin during operation of the electrical motor;
   controlling the motor in accordance with the set safety margin.

6. A speed drive for controlling an electrical motor, comprising:
   a control unit for executing the method according to claim 1.

7. An electrical motor system, comprising:
   an electrical motor; and
   a speed drive according to claim 6;
   wherein the speed drive is connected to the electrical motor for controlling operation thereof.

* * * * *